United States Patent
Shaw et al.

(10) Patent No.: US 12,418,035 B2
(45) Date of Patent: Sep. 16, 2025

(54) SEALING MATERIAL

(71) Applicant: Flexitallic Investments, Inc., Houston, TX (US)

(72) Inventors: Stuart John Shaw, Cleckheaton (GB); John Hoyes, Yorkshire (GB)

(73) Assignee: Flexitallic Investments, Inc., Houston, TX (US)

( * ) Notice: Subject to any disclaimer, the term of this patent is extended or adjusted under 35 U.S.C. 154(b) by 738 days.

(21) Appl. No.: 17/043,640

(22) PCT Filed: Mar. 29, 2019

(86) PCT No.: PCT/GB2019/050926
§ 371 (c)(1),
(2) Date: Sep. 29, 2020

(87) PCT Pub. No.: WO2019/186197
PCT Pub. Date: Oct. 3, 2019

(65) Prior Publication Data
US 2021/0020964 A1    Jan. 21, 2021

(30) Foreign Application Priority Data

Mar. 29, 2018  (GB) ...................... 1805199

(51) Int. Cl.
*H01M 8/0282* (2016.01)
*C09K 3/10* (2006.01)
*F16J 15/10* (2006.01)
*H01M 8/0276* (2016.01)
*H01M 8/12* (2016.01)

(52) U.S. Cl.
CPC ......... *H01M 8/0282* (2013.01); *C09K 3/1003* (2013.01); *F16J 15/102* (2013.01); *H01M 8/0276* (2013.01); *H01M 8/12* (2013.01); *C09K 2200/0239* (2013.01); *C09K 2200/0252* (2013.01); *H01M 2008/1293* (2013.01)

(58) Field of Classification Search
CPC ............... H01M 8/028; H01M 8/0282; H01M 8/0276; H01M 8/12; H01M 2008/1293
See application file for complete search history.

(56) References Cited

U.S. PATENT DOCUMENTS

| | | | |
|---|---|---|---|
| 4,271,228 A | 6/1981 | Foster et al. | |
| 2014/0242493 A1* | 8/2014 | Irvine | H01M 8/225 429/479 |
| 2015/0372324 A1* | 12/2015 | Rautanen | H01M 8/0282 429/509 |
| 2017/0217829 A1* | 8/2017 | Ashworth | C09D 7/61 |
| 2018/0141860 A1* | 5/2018 | Bond | C04B 30/00 |
| 2019/0051916 A1* | 2/2019 | Bone | H01M 8/0232 |

FOREIGN PATENT DOCUMENTS

| | | |
|---|---|---|
| JP | H03-210771 A | 9/1991 |
| JP | H07-502562 A | 3/1995 |
| JP | 2008-527101 A | 7/2008 |
| JP | 2014-505347 A | 2/2014 |
| JP | 2016-511506 A | 4/2016 |
| JP | 2018-515664 A | 6/2018 |
| WO | 2016012750 A1 | 1/2016 |
| WO | 2016/185220 A1 | 11/2016 |
| WO | 2018042160 A1 | 3/2018 |

OTHER PUBLICATIONS

International Preliminary Report on Patentability from related International Application No. PCT/GB2019/050926 dated, Sep. 29, 2020, 7 pages.
International Search Report in related International Application No. PCT/GB2019/050926 dated, Jun. 27, 2019, p. 3 pages.
Written Opinion in related International Application No. PCT/GB2019/050926 dated Jun. 27, 2019, 13 pages.
Rautanen, M., et al., "Glass Coated Compressible Solid Oxide Fuel Cell Seals", Journal of Power Sources, vol. 247, Feb. 2014, pp. 243-248.
Search and Examination Report from related GB Application No. GB1805199.5 dated Oct. 1, 2018, 7 pages.
Corresponding Canadian Application No. 3,094,973, Office Action, dated Mar. 5, 2024, 3 pages.
Gabrovšeka, Roman, et al., "Evaluation of The Hydration of Portland Cement Containing Various Carbonates by Means of Thermal Analysis." Acta Chim. Slov 53.2, 2006, pp. 159-165.

* cited by examiner

*Primary Examiner* — Jeremiah R Smith
(74) *Attorney, Agent, or Firm* — Kilpatrick Townsend & Stockton LLP

(57) ABSTRACT

The present invention relates to composite sealing materials for a gasket. The gaskets are useful in solid oxide fuel/electrolyser cells (SOFC and SOEC). The fuel cell gaskets contain sealing material based upon chemically exfoliated vermiculite that has improved corrosion resistance. The sealing material comprises chemically exfoliated vermiculite; filler; and insoluble carbonate.

21 Claims, No Drawings

SEALING MATERIAL

CROSS-REFERENCE TO RELATED APPLICATIONS

This application is the U.S. national phase of International Application No. PCT/GB2019/050926 filed on Mar. 29, 2019, and published on Oct. 3, 2019 as International Publication No. WO 2019/186197 A1, which application claims priority to and the benefit of British Application No. 1805199.5, filed on Mar. 29, 2018, the contents of all which are incorporated herein by reference in their entireties.

FIELD

The present invention relates to sealing material for a gasket, more specifically, the present invention relates to fuel cell gaskets containing sealing material based upon chemically exfoliated vermiculite that has improved corrosion resistance. In particular, the invention relates to sealing material for gaskets for use in solid oxide fuel/electrolyser cells (SOFC and SOEC).

BACKGROUND

SOFC or SOEC stacks require effective high temperature gaskets to operate efficiently. Such gaskets must be able to substantially prevent fuel, for example hydrogen, leakage; fuel and oxidant mixing; and oxidant leakage. They must also be stable, particularly when exposed to the high temperatures that are reached during the use of the SOFC or SOEC. Such temperatures are normally in excess of 600° C.

SOFC stack gaskets can be of different types. These may be termed bonding gaskets (e.g. glass/glass-ceramic or brazes), non-bonding (compressible) gaskets or multiple material gaskets. The multiple material gaskets can include elements of compressible gaskets and bonding gaskets.

Compressible components in SOFC gaskets can be desirable due to a higher resistance to thermal cycling than bonding components which are rigidly bonded to adjacent surfaces and are susceptible to cracking during thermal cycling of the SOFC.

SOFCs include parts which are subject to corrosion under certain conditions. It would be advantageous to reduce or remove this problem. It is one object of one or more aspects of the present invention to provide a sealing material for gaskets for use in SOFCs that provides reduced corrosion of the SOFC. It is also desirable that such a sealing material and gasket should maintain the other properties required for SOFC gasket, such as the ability to form the sealing material into sheets, and the gaskets having acceptable leakage rates and compatibility with other components of the cell.

SUMMARY

According to a first aspect of the present invention there is provided a sealing material for a gasket comprising:
(a) chemically exfoliated vermiculite;
(b) filler; and
(c) insoluble carbonate.

According to a second aspect of the present invention there is provided a composition for use in forming a sealing material according to the first aspect of the present invention. Preferably, the composition further comprises a liquid carrier. Specifically, the composition of the second aspect of the present invention preferably comprises:

(a) chemically exfoliated vermiculite;
(b) filler;
(c) insoluble carbonate; and
(d) a liquid carrier.

According to a third aspect of the present invention there is provided a gasket for a solid oxide cell, suitably for sealing two mating surfaces of a solid oxide cell, the gasket comprising:
(a) chemically exfoliated vermiculite;
(b) filler; and
(c) insoluble carbonate.

The gasket of the third aspect may comprise chemically exfoliated vermiculite, filler and insoluble carbonate in a core layer that is interposed between a first and second coating layer, the said coating layers each comprising glass, glass-ceramic and/or ceramic material. Typically, however, the gasket does not comprise coating layers.

Suitably, the gasket of the third aspect of the present invention is a gasket for a solid oxide fuel cell (SOFC) or a solid oxide electrolyzer cell (SOEC).

According to a fourth aspect of the present invention, there is provided a solid oxide cell or a solid oxide cell component comprising one or more gaskets according to the third aspect of the present invention. Preferably, the solid oxide cell is a SOFC or a SOEC.

It will be apparent from the foregoing aspects of the invention that the sealing material/gasket/core layer is a composite. The composite may also be in the form of a sheet or a foil. Such sheets/foils can be cut or formed into appropriate shapes for use as a gasket or as a core layer of a gasket or as a sealing material.

According to a fifth aspect of the present invention there is provided use of a gasket according to the third aspect of the present invention to reduce corrosion in a solid oxide cell, particularly a SOFC or SOEC, particularly on metal surfaces thereof, more particularly, steel surfaces thereof.

According to a sixth aspect of the present invention there is provided use of an insoluble carbonate, such as calcium carbonate, in sealing material for a solid oxide cell to reduce corrosion in the solid oxide cell, particularly a SOFC or SOEC, suitably in a chemically exfoliated vermiculite composite sealing material.

According to a seventh aspect of the present invention there is provided a process for the production of sealing material/composition/sheet/foil/gasket/core layer according to any of the first to sixth aspects of the present invention comprising the steps of:—
  a. mixing chemically exfoliated vermiculite (CEV) with a filler and an insoluble carbonate to form an intimate mixture thereof;
  b. optionally, adding a liquid carrier, typically water;
  c. optionally, forming a sheet or foil from the mixture;
  d. drying the said mixture;
  e. optionally, forming a gasket or core layer from the sheet or foil.

According to an eighth aspect of the present invention, there is provided a process for the production of a gasket according to the third aspect of the present invention, the process comprising the steps of:
  a. coating a glass or glass-ceramic layer onto each of the opposed surfaces of a core layer, sheet or foil according to the first or third aspect of the present invention;
  b. locating the coated gasket in a fuel cell between mating surfaces to be sealed;
  c. optionally, heating the gasket to remove any remaining volatile organic components;
  d. optionally, heating the gasket to effect sintering of the coating layers;

e. optionally, further heating to effect wetting of the coating layers.

According to a ninth aspect of the present invention there is provided a process for producing a gasket according to the third aspect of the present invention comprising the steps of:
 a. coating a glass or glass-ceramic layer onto each of the mating surfaces to be sealed;
 b. locating a core layer, sheet or foil according to the first or third aspects of the present invention between the coated mating surfaces to be sealed;
 c. mating the coated surfaces and interposed core layer together;
 d. optionally, heating the gasket to remove any remaining volatile organic components;
 e. optionally, heating the gasket to effect sintering of the coating layers;
 f. optionally, further heating to effect wetting of the coating layers.

According to a tenth aspect of the present invention there is provided a process for producing a solid oxide cell component or of sealing a solid oxide cell component comprising incorporating at least one gasket according to the third aspect of the present invention into the solid oxide cell component. Said gasket may be incorporated into the solid oxide cell component according to steps b to e of the eighth aspect of the present invention or steps a to f of the ninth aspect of the present invention.

DETAILED DESCRIPTION

Surprising it has been found that the present invention provides reduced corrosion of a solid oxide cell in use.

Advantageously, it has surprisingly been found that the use of an insoluble carbonate in the composite of the present invention leads to reduced corrosion. Furthermore, reduced corrosion in the fuel cell may be achieved without degrading other properties of the composite, for example the composite can be formed into gaskets having acceptable leak rates and compatibility with other components of the SOFC.

Insoluble Carbonate

The insoluble carbonates may have a solubility in water of less than 0.1 g/ml in water at 25° C.

The insoluble carbonate may be selected from a group II carbonate, for example, suitably selected from calcium carbonate or strontium carbonate, preferably the insoluble carbonate is calcium carbonate.

The insoluble carbonate may be present in the composite whether as a sealing material/composition/sheet/foil/gasket/core layer in an amount of 1-15% w/w of the dry composite. Preferably, in an amount of 2-15% w/w or 3-15% w/w, most preferably in an amount of 4-15% w/w, especially, 5-12% w/w of the dry composite.

The insoluble carbonate particles may have any suitable shape. Suitably, the insoluble carbonate comprises substantially spherical particles.

The $d_{50}$ average particle size of the insoluble carbonate as, for example, determined by light scattering with a Malvern Mastersizer™ may be from 0.5 to 50 µm, such as 1 to 25 µm, for example 1.5 to 15 µm or 2 to 10 µm.

CEV

Chemically Exfoliated Vermiculite (CEV) is formed by treating vermiculite ore and swelling it in water. In one possible preparation method, the ore is treated with saturated sodium chloride solution to exchange magnesium ions for sodium ions, and then with n-butyl ammonium chloride to replace sodium ions with n-butyl ammonium ions. Alternatively, the ore may be treated with saturated lithium citrate solution in a one step process. On washing of the treated ore with water swelling takes place. The swollen material is then typically subjected to high shear to produce an aqueous suspension of very fine (normally with a diameter below 50 µm) vermiculite particles. Other chemical treatment agents are known to those skilled in the art.

The water may also be removed from the aqueous suspension to form dry CEV particles. Preferably, the dry CEV is prepared by a suitable drying technique such as those well known to the skilled man. Suitable drying techniques include cake drying and pulverising; film drying and pulverising; rotary hot air drying; spray drying; freeze drying; pneumatic drying; fluidised bed drying of partially dried solid; and vacuum methods including vacuum shelf drying.

The cations that are used to swell the vermiculite, such as lithium and alkyl ammonium ions, are present in the CEV that is formed. These cations are exchangeable cations because they may be exchanged for other cations, for example by contacting the CEV with a solution of suitable replacement cations. Accordingly, the CEV can be considered to contain an amount of exchangeable cations, suitably exchangeable monovalent cations.

Preferably, the CEV of the present invention is unmodified CEV. By unmodified CEV it is meant CEV that has not been subjected to further cation exchange after the vermiculite has been chemically exfoliated. Suitably, the exchangeable cations of the CEV are therefore formed of the cations used to swell the CEV. Preferably, the cations used to the swell the vermiculite (for example lithium, n-butyl ammonium or n-propyl ammonium ions) form 80%, 90%, 95%, 98%, 99% or 100% of the exchangeable cations of the CEV.

Preferably, CEV provides up to 100% w/w of the total exfoliated vermiculite in the composite for the sealing material/composition/sheet/foil/gasket/core layer, typically, 80-100% w/w, more typically, 90-100%, generally about 100% CEV w/w total exfoliated vermiculite in the composite. The composite may also include dry derived CEV. However, generally the source of CEV is an aqueous dispersion thereof prepared directly from the vermiculite ore such as detailed herein.

Preferably, the level of CEV in the composite sealing material/composition/sheet/foil/gasket/core layer of any aspect of the present invention is at least 25% w/w of the composite, such as at least 30% w/w, more preferably at least 35% w/w of the composite, most preferably at least 40% w/w of the composite.

Typically, the level of CEV in the composite sealing material/composition/sheet/foil/gasket/core layer of any aspect of the present invention is in the range of 25-74% w/w of the composite, such as 30-69% w/w, more preferably, 35-64% w/w, most preferably, 40-59% w/w composite.

Typically, the $d_{50}$ average particle size of the CEV, as, for example, determined by light scattering with a Malvern Mastersizer™ is in the range 1 µm to 100 µm, more preferably 5 µm to 50 µm, most preferably 10 µm to 30 µm.

Typically, the chemically exfoliated vermiculite in any aspect or preferred or otherwise optional aspect herein is not modified CEV comprising water resistance enhancing monovalent cations as described in WO2016/185220.

By water resistance enhancing monovalent cations is meant cations which improve the water resistance of the sealing material, sheet, ring or layer. Water resistance may be manifest by preventing the filler from softening and extruding from the sealing material which reduces the structural integrity thereof. The water resistance enhancing monovalent cations therein can be introduced by cation exchange with cations, suitably, other monovalent cations, in the unmodified CEV. It will be appreciated that the water resistance enhancing monovalent cations are generally cations of an element of the periodic table or molecule other than monovalent cations which are generally replaced in the unmodified CEV such as lithium or n-butyl ammonium ($C_4H_9NH_3^+$). Therefore, the water resistance enhancing monovalent cations are suitably more water resistance enhancing than a lithium cation, more suitably than a lithium and/or $C_4H_9NH_3^+$ monovalent cation.

It will be appreciated from the foregoing that the water resistance enhancing monovalent cations in the modified CEV of WO2016/185220 are typically present at cation exchange sites in the CEV.

Filler

Preferably, the fillers of any aspect of the present invention are inert fillers. By inert fillers is meant not effective as binders in the composite sealing material/composition/sheet/foil/gasket/core layer of the present invention and/or generally chemically inert in the applications of the gasket of the invention. Suitably, the fillers are non-hygroscopic, unreactive with water and/or are not reinforcing.

Suitable inert fillers are plate-like or particulate fillers known to those skilled in the art.

Plate-like fillers include talc, other forms of vermiculite and mica. Other forms of vermiculite include thermally exfoliated vermiculite. Preferably, the filler is milled. Suitable particulate fillers include amorphous silica and quartz silica. Preferably, the filler is or comprises a plate-like filler. Preferably, the filler or particulate filler is not or does not contain calcium carbonate, more preferably, is not or does not contain an insoluble carbonate.

Plate-like filler in the context of the present invention means fillers which adopt plate, layered or leaf shaped structures in the composite of the present invention. In general, a plate-like filler has an average width of plates of at least three times the average thickness. In a composite according to any aspect of the invention, it is found that the particles of the plate-like filler, when present, tend to orientate themselves into the plane of the composite sealing material/sheet/foil/gasket/core layer and act like a large number of tiny leaf springs, thereby improving sealing.

In the composite in accordance with any aspect of the present invention the plate-like filler may be selected from the group consisting of talc, molybdenum disulphide, hexagonal boron nitride, soapstone, pyrophyllite, milled thermally exfoliated vermiculite, mica, fluoromica, powdered graphite, glass flake, metal flake, ceramic flake, or kaolinites. A preferred vermiculite material is one with a plate size substantially in the range 50-300 μm for example FPSV available from Speciality Vermiculite. FPSV is a registered trade mark. Most preferably, the filler is or comprises talc. An example talc filler is Magsil™ Diamond D200 available from Richard Baker Harrison Limited.

Preferably, the level of filler in the composite of any aspect of the present invention is at least 25% w/w of the composite, such as at least 30% w/w, more preferably at least 35% w/w, 40% w/w or 45% w/w of the composite.

Typically, the level of filler in the composite of any aspect of the present invention is in the range of 32-69% w/w of the composite, such as 35-64% w/w, more preferably, 40-59% w/w composite.

Typically, the $d_{50}$ average particle size of the filler as, for example, determined by light scattering with a Malvern Mastersizer™ is in the range 10 nm to 50 μm, more preferably, 50 nm to 30 μm, most preferably 500 nm to 25 μm.

The surface area of the filler as determined by nitrogen absorption such as ISO 9277 may be less than 200 $m^2/g$, more preferably less than 10 $m^2/g$, most preferably less than 5 $m^2/g$.

The filler may have any suitable Mohs hardness. The Mohs hardness of the filler may be less than 3, preferably less than 2.5 or less than 2, more preferably less than 1.5. Suitably, the Mohs hardness of the filler is less than the Mohs hardness of the insoluble carbonate. Suitably the Mohs hardness of the insoluble carbonate is at least 3.

Preferably, the CEV, filler and insoluble carbonate are intimately mixed and preferably, each evenly distributed throughout the composite sealing material/composition/sheet/foil/gasket/core layer so that they form a generally homogeneous mixture.

Typically, the composite sealing material/composition/sheet/foil/gasket/core layer of the present invention has a density prior to use of 1.5-2.2 $g/cm^3$, more typically, 1.7-2.0 $g/cm^3$, most typically, around 1.9 $g/cm^3$.

Other Components

Optionally, further additives may be present in the composite of any aspect of the present invention in the range 0-8% w/w of the composite, more typically, 0-5% w/w, most typically, 0-3% w/w.

Suitable further additives may be selected from reinforcing agents such as milled glass fibre or rubber.

It will be appreciated that the combined level of CEV, filler and insoluble carbonate will not exceed 100% w/w of the composite and may be from 90% w/w, suitably from 92% w/w, more suitably, from 93% w/w, most suitably, from 95 or 97% w/w in the presence of other additives so that the level selected in the ranges above should be combined accordingly.

Liquid Carrier for the Sealing Material

The composition for use in forming a composite sealing material according to the first aspect of the present invention preferably comprises a liquid carrier. The liquid carrier is preferably water.

Suitably, the solids content of the composition of the second aspect is at least 15% w/w of the composition, such as at least 20% w/w, preferably at least 25% w/w, most preferably at least 28% w/w of the composition. The solids content of the composition may be up to 60% w/w of the composition, such as up to 55% w/w, preferably up to 50% w/w, more preferably up to 45% w/w, most preferably up to 40% w/w of the composition. The solids content of the composition may be from 15% to 60% w/w of the composition, such as from 20% w/w to 55% w/w, preferably from 25% w/w to 50% w/w, more preferably from 28% w/w to 45% w/w, most preferably from 28% w/w to 40% w/w of the composition.

Coating Layer

The gasket of the present invention may comprise a first and a second coating layer. The coating layers may hermetically seal the mating surfaces of the SOFC or SOEC and bond to the core layer of the gasket. The coating layers are suitably operable to accommodate surface imperfections in the mating surfaces thus acting to substantially seal direct leak paths. Furthermore, when one or more of the coating layers are arranged directly adjacent to the core layer, the coating layer(s) may act to accommodate surface imperfections in the core layer material, thus also substantially sealing direct leak paths in the core layer. Accordingly, the core layer and coating layers are preferably bonded together. As such, preferably the coating layers are arranged in the gasket such as to be in contact with the core layer, preferably, by direct coating of the core layer to form an immediate first and second coat on opposed facing surfaces of the core layer. The coating layers of the invention are particularly advantageous due to surface imperfections and striations being typical on the surface of the core layer of the present invention.

Preferably, the coating layers are of an amorphous, crystalline or semi-crystalline character. In general, the coating layers may comprise any degree of amorphous or crystalline character depending upon the application and may be of any composition in the continuum between a material of a completely crystalline or amorphous nature. Furthermore, the coating may be altered to higher proportions of crystalline content over time by, for example, exposure to elevated temperatures. Preferably, the coating layers comprise glass or a mixture of glass and ceramic material. The materials are selected so that the coating is sufficiently deformable at the chosen operating temperature and compressive stress. Where the coating material includes crystalline character this may be in the range 5-70% w/w, more typically, 10-60%, most typically, 20-50% w/w at operating temperatures using XRD and the Rietveld Method.

Usually, the glass or glass-ceramic material contains amounts of Si, Al, Mg, Na, Ca, Ba and/or B in their various oxidised forms. Typically, the glass or glass-ceramic material is of the type which hardens and sets in water, for example in an equivalent amount of water by weight. Preferably, glass or glass-ceramic material comprises one or more of the compounds selected from $SiO_2$, $Al_2O_3$, $B_2O_3$, $BaO$, $Bi_2O_3$, $CaO$, $Cs_2O$, $K_2O$, $La_2O_3$, $Li_2O$, $MgO$, $Na_2O$, $PbO$, $Rb_2O$, $Sb_2O_3$, $SnO$, $SrO$, $TiO_2$ $Y_2O_3$ and/or $ZnO$, for example selected from one or more of $BaO$, $ZnO$, $B_2O_3$, $CaO$ and/or $Al_2O_3$, such as one or more of $BaO$, $B_2O_3$, $Al_2O_3$ and/or $CaO$. It will be understood by the skilled man that the exact composition of the coating layers will depend upon the operating conditions of the fuel cell, such as the operating temperature. Preferably, the coating layers comprise one or more suitable glass or glass-ceramic materials suitable for use in coatings for fuel cell applications.

Various commercially available glass/glass-ceramic materials that are suitable for use in the present invention are available, for example, Schott™ GM 31107, Kerafol™ KeraGlas ST K01 or HCStarck™ HCS3.

The coatings of the present invention may be adapted to be conformable to the core layer in such a manner that the coating fills the imperfections in the core layer surface and thereby seals leak paths. Generally, this takes place during operating temperatures.

The type of coating material may be varied according to the desired operating temperature of the stack. For example, where a fuel stack has a particular operating temperature, the coating materials may be selected so that the viscosity of the materials are tailored to the stack operating temperature so that the coating conforms to the adjacent surfaces at those temperatures. It is preferable that the glass/glass-ceramic materials have a wetting-flowing temperature in the region of or above the operating temperature of the fuel cell in which the seal is to be used. For example, where a fuel cell stack has an operating temperature of 700° C. a coating material having a wetting-flowing temperature range of around 700 to 800° C. may be used. Accordingly, the preferred required sealing temperature of the coating material is above the softening temperature, more typically, between the softening and hemisphere temperatures of the coating as the hemisphere temperature is generally indicative of the onset of the wetting phase. Fuel cell operating temperatures vary depending on the nature of the stack and may be between 500° C. and 1000° C. but are generally between 650° C. and 1100° C. and generally the coating material should still provide an effective seal at the lowest operating temperature. Accordingly, the preferred softening temperature range of the coating material is between 450 and 1000° C., more preferably, 500-950° C. to meet the requirements of various fuel cells. The hemisphere temperature range may be 10-500° C. higher than the ranges for the softening temperature, more preferably, 10-200° C. However, it is preferred in some embodiments in the present invention for the hemisphere temperature to be below the upper operating temperature of the fuel cell so that the wetting phase or even the flowing phase may be reached during initial cycling as this will assist sealing between the core layer and coating layers. The flowing temperature of the coating material may be 5-100° C. above the hemisphere temperature ranges. Typical flowing temperature ranges are 800-1500° C. but for glass-ceramic composites in the range 750-1100, more preferably, 800-1050° C. It will be appreciated that the pressure on the stack will also affect the sealing, hemisphere and flowing temperature. However, the temperature ranges above may be determined by a hot stage microscope at atmospheric pressure.

Preferably, each coating layer has a thickness of between 0.1 and 50 μm, more typically, 0.5 and 25 μm, 1 to 15 μm.

Although multiple coats of coatings composition may be applied, preferably only one coat of coating composition is applied for each coating layer in the gasket.

Typical densities of the glass or glass-ceramic coatings are in the range 2-4 g/cm$^3$.

Weight per unit area (mg/cm$^2$) of the coatings will depend on the nature of the coatings and the thickness of the coatings applied to the gasket but is typically in the range 0.2 to 8 mg/cm$^2$ after organic burnoff.

Suitably, the coating layers may initially have a viscosity of 1 to 10$^4$ Pa·s when the temperature in the stack is at the operating temperature. However, over time, the amorphous phases may increasingly crystallise leading to increases in viscosity at operating temperature.

Advantageously, a low viscosity of the coating layers permits good wetting of adjacent surfaces as well as penetration to the exfoliated vermiculite pores.

Properties of the Sealing Material/Sheet/Foil

Preferably the composite of the sealing material/sheet/foil/gasket/core layer is compressible, typically compressible in the direction perpendicular to its facing surfaces. Suitably, the core layer is more compressible than the coating at lower temperatures, in particular below the glass transition temperature of the coatings.

Typically, the uncompressed thickness of the composite is in the range of 10-2000 μm, more typically 50-1500 μm, most typically 300-1000 μm. Suitably, the thickness of the uncompressed gasket comprising the coating layers also falls within these ranges.

Typically, the composite is compressible under a load of 15 MPa to a thickness at least 10% less than the uncompressed thickness, more typically at least 15% less, most typically at least 20% less than the uncompressed thickness. Compression may be carried out using a suitable method such as according to EN13555.

Properties of the Solid Oxide Cell

The mating surfaces of the SOFC or SOEC may be formed of the same or different materials. Preferably, the mating surfaces are formed of metal or ceramic. Most preferably, the mating surfaces are formed of steel such as high temperature ferritic steel. A suitable stainless steel is Crofer 22 APU™ which forms a chromium—manganese oxide layer which is very stable up to 900° C.

The fuel cell may comprise thin interconnect plates which can be conveniently produced by pressing rather than etching or machining, for example. Typically, the thin metal plates of the fuel cells of the invention are in the range 0.1 to 1.5 mm thickness, more preferably, 0.1 to 1 mm thickness, most suitably, 0.1 to 0.5 mm thickness. The plates are suitably made from metal or ceramic at these thicknesses, more suitably, steel.

The solid oxide cell according to the fourth aspect of the present invention may comprise gaskets between one or more of the cell electrolyte and cathode; the electrolyte and anode; the cathode and anode; the cell and an interconnect, an interconnect and an interconnect; an interconnect and an endplate; a cell and an endplate; and/or a cell and a cell.

The composite sealing material may comprise CEV at 25-70% w/w, filler at at least 25% w/w and insoluble, preferably, calcium, carbonate at a level of 1-15% w/w of the composite sealing material wherein the CEV is 80-100% w/w of the total exfoliated vermiculite in the composite sealing material and the filler is other than calcium carbonate.

Use Aspects

According to fifth aspect of the present invention there is provided use of a gasket according to the third aspect of the present invention to reduce corrosion in a solid oxide cell, particularly a SOFC or SOEC, particularly on metal surfaces thereof, more particularly, steel surfaces thereof.

Such surfaces are generally in contact with or in proximity to the gasket in use.

According to sixth aspect of the present invention there is provided use of an insoluble carbonate, such as calcium carbonate, in sealing material for a solid oxide cell to reduce corrosion in the solid oxide cell, particularly a SOFC or SOEC, suitably in a chemically exfoliated vermiculite composite sealing material.

Process Aspects

According to a seventh aspect of the present invention there is provided a process for the production of sealing material/composition/sheet/foil/gasket/core layer according to any of the first to sixth aspects of the present invention comprising the steps of:
a. mixing chemically exfoliated vermiculite (CEV) with a filler and an insoluble carbonate to form an intimate mixture thereof;
b. optionally, adding a liquid carrier, typically water;
c. optionally, forming a sheet or foil from the mixture;
d. drying the said mixture;
e. optionally, forming a gasket or core layer from the sheet or foil.

Suitably, the CEV may be formed by treating vermiculite ore with suitable cation solution followed by washing of the treated ore. Treatment with several cations is possible. As such, the CEV of step a may be at least partially, and preferably completely, treatment cation saturated. The treatment cation may be any suitable cation but is typically, lithium, n-butyl ammonium ((n-butyl)$NH_3^+$), or n-propyl ammonium ((n-propyl)$NH_3^+$), more typically, lithium such as that in the form of lithium citrate. A pre-treatment step of the vermiculite ore with sodium is typically required when (n-butyl) $NH_3^+$ or (n-propyl) $NH_3^+$ is used as the treatment cation. On washing of the treated ore with water swelling takes place. The swollen material is then subjected to high shear to produce an aqueous suspension of very fine (diameter below 50 μm) vermiculite particles. Other chemical treatment agents are known to those skilled in the art.

Preferably, after mixing of the CEV, typically wet CEV in slurry form, although dry powder CEV may be added to increase the CEV content, with the filler and the insoluble carbonate, the intimate mixture is formed into a composite sheet or foil and dried.

The sheet/foil may be formed by calendering a wet dough composition or by drying after spreading a wet dough composition with a doctor blade.

The formed composite may be compacted and such compaction may be carried out prior to use. Alternatively, the compacting may take place during formation, such as cutting, of the gasket or core layer from the sheet or foil. Compacting potentially enhances the integrity of the composite and improves performance. Typically, the density of uncompacted composite is 0.9 $g/cm^3$ to 1.5 $g/cm^3$; more preferably 1.0 $g/cm^3$ to 1.4 $g/cm^3$, more preferably 1.1 $g/cm^3$ to 1.3 $g/cm^3$. Suitable compacting pressures will result in a composite material of density in the range 1.0-2.1 $g/cm^3$, more preferably 1.2 $g/cm^3$ to 2.0 $g/cm^3$, most preferably 1.6 $g/cm^3$ to 1.9 $g/cm^3$.

According to an eighth aspect of the present invention, there is provided a process for the production of a gasket according to the third aspect of the present invention, the process comprising the steps of:
a. coating a glass or glass-ceramic layer onto each of the opposed surfaces of a core layer, sheet or foil according to the first or third aspect of the present invention;
b. locating the coated gasket in a fuel cell between mating surfaces to be sealed;
c. optionally, heating the gasket to remove any remaining volatile organic components;
d. optionally, heating the gasket to effect sintering of the coating layers;
e. optionally, further heating to effect wetting of the coating layers.

The process of the present invention may include the step of forming, preferably cutting, the sheet/foil into a core layer having required shape prior to or after coating step a. Preferably, the forming, more preferably, cutting step takes place prior to step a. In this manner recycling of any unused parts of the sealing layer is more easily effected as separation from the coating layer is then avoided.

The coating layers may be applied to the composite in any manner known to the skilled man. Preferably, the coating is applied in the form of a liquid suspension or paste-type formulation. For example, the coating layers may be applied by spraying, brushing, spatula, roller, draw bars, tape or screen printing. The method of application will dictate to a certain extent the content of the coating formulation. Accordingly, the coating formulation typically includes a binder component. The binder component will usually be one or more of an organic and/or polymeric binder(s). A mixture of binders may be required to suit the application. Furthermore, the coating formulation typically includes a liquid carrier component. The liquid carrier component may be a solvent for the binder or the mixture of binders. There may be more than one carrier in the liquid carrier component, for example, the liquid carrier component could be made up of a mixture of one or more solvent carriers and/or one or more liquid non-solvating carriers.

In general, the coating layer may be applied as a brush-type coating or a spray-type coating formulation. When the coating layer is applied by spraying, the coating layer formulation will comprise one or more suitable binders (typically, organic binders), glass or glass-ceramic powder and usually a high level of liquid carrier. For reasons of delivery, the spray-type coating formulations require higher levels of liquid carrier than the brush-type coating formulations. As such, when the coating layer is applied with a brush-type formulation, the formulation will generally comprise one or more suitable binders (typically, organic binders), glass or glass-ceramic powder and a reduced level of liquid carrier. The brush-type coating formulations are generally suitable for all the non-spray application methods. Typically, a brush-type coating formulation may have 30-90% by wt glass or glass-ceramic material in the formulation, more typically 40-80% by wt, most typically 50-75% by wt. Accordingly, in this case, the binder component and liquid carrier component substantially provide the balance of the coating formulation. In a spray-type formulation, the glass, glass-ceramic or ceramic component may provide 10-70 wt %, more typically, 20-60 wt %, most typically, 30-50 wt % of the composition with the balance again substantially made up of the organic binder component and liquid carrier component.

In use, the liquid carrier component generally evaporates during drying and the binder component in the coating layer and any remaining liquid carrier component is removed due to the heating up of the fuel cell prior to use. Accordingly, after production and initial drying the gasket includes binder component, whereas in use, the binder component is substantially removed. Preferably, the liquid carrier component comprises solvent for one or more of the components in the coating formulation or may simply act as a carrier in which components are dispersed.

Usually, the liquid carrier component will include solvent and/or non-solvating carrier. Preferably, the solvent is able to substantially dissolve the one or more binders. Suitable solvents may be selected organic solvents and/or water. Suitable organic solvents may be selected from the list including terpineols (including the known isomers thereof α-, β-, γ-, and 4-terpineol); ketones such as diethyl ketone, methyl butyl ketone, dipropyl ketone and cyclohexanone; alcohols such as ethanol, n-pentanol, 4-methyl-2-pentanol, cyclohexanol and diacetone alcohol; ether based alcohols such as ethylene glycol monomethyl ether, ethylene glycol monoethyl ether, ethylene glycol monobutyl ether, propylene glycol monomethyl ether and propylene glycol monoethyl ether; unsaturated aliphatic alkyl monocarboxylates such as n-butyl acetate and amyl acetate; lactates such as ethyl lactate and n-butyl lactate; ether-based esters such as methyl cellosolve acetate, ethyl cellosolve acetate, propylene glycol monomethyl ether acetate and ethyl-3-ethoxypropionate. They may be used alone or in combination of two or more. A preferred non-solvating liquid carrier is water. A preferred solvent carrier mixture is ethanol and terpineol.

Preferably, the liquid carrier component is present in the range 1-60% of the substantially dried coating layer, more typically 10-50% w/w dried coating layer, most typically, 10-30% w/w dried coating layer. Accordingly, the glass, glass-ceramic or ceramic component is generally present in the range 40-99% w/w dried coating, more typically, 50-90% w/w, most typically 50-90% w/w. However, in practice some residual liquid carrier may also be present in the dried coating. After heat treatment to burn off any residual liquid and binder component, particularly any organic binder, the coating layers preferably comprise greater than 80 wt % glass or glass-ceramic, more preferably greater than 90 wt %, most preferably greater than 95 wt %, especially greater than 99 wt %.

When the binder is a polymeric binder in the coating carrier composition it may be selected from any which substantially burn off prior to stack operation. Binders which leave a minimal carbon deposit are preferred. Examples may be selected from one or more of cellulose binders, such as ethyl cellulose; acrylate homo or copolymers; vinyl acetate homo or copolymers; ethylene copolymers; rosin; and/or polyvinyl butyral, preferably acrylate homo or copolymers or vinyl acetate homo or copolymers, especially acrylate homo or copolymers. Suitable acrylic homo or copolymers are known to the skilled person for example, those defined in EP 1566368A2, paragraphs [0024] to [0028].

The coating formulations may additionally comprise further additives known to the skilled person, for instance, in a water based coating, such as a latex, emulsifier may be required.

It will be clear to the skilled man that the contents and the proportions of the coating formulation may be altered according to the desired properties of the formulation, such as thickness, adherence etc.

The coating formulation may be formed by any method known to the skilled man. Usually, the coating formulation can be prepared by mixing the organic binder component, any liquid carriers and glass or glass and ceramic powders.

The coated core layer may be dried in a conventional oven. The length and temperature of the drying step will depend, for example, upon the content of the coating formulation and the thickness of the coating layer. In general, it is preferable to dry the coating layers at a temperature below the boiling point of the liquid carrier in order to avoid bubble formation in the coating layers and ensure complete drying. For example, when ethanol is used in the liquid carrier component, the coating layers may be dried at around 70° C. until the desired amount of liquid carrier has been removed. In one embodiment, a proportion of liquid carrier component is left in the coating layers after drying. Advantageously, the coating layers in this form can serve as a low temperature adhesive, and as such serve to improve the ease of handling the assembled components prior to first use.

Preferably, the coating layers are bonded to the core layer before stack assembly and heat-up.

The conditions of the heat treatment steps c to e in the eighth aspect of the invention will depend upon the coating composition used. The heat treatment is preferably optimised such that the coating layers accommodate any imperfections in the surface of the core layer.

Preferably, the heat treatment process is carried out using either a step-wise, continuous or mixed step-wise and continuous temperature gradient. For example, the temperature may be increased at a relatively steady rate of between 20 to 100 K/h, more preferably between 50 to 70 K/h, most preferably between 55 to 65 K/h. Typically, the rate of temperature increase will allow for the evaporation and burn out of the organic binder component to be completed before the glass begins to sinter. The temperature at which sintering and wetting occurs will depend upon the coating composition used. Preferably, the heat treatment is conducted in an atmosphere of air. Typically, organic binder component burn off takes place below 500° C.

Optionally, the heat treatment is carried out in a step-wise manner, meaning the temperature is raised and substantially held at a specific raised level for a period of time before being further raised and substantially held, and so on until heating is complete. As such, in one embodiment, the heating may involve removing any remaining liquid carrier component at a relatively low temperature. The temperature may then be raised to a higher temperature and maintained at this temperature to allow for a controlled burnout of any organic carriers. A controlled burnout is favoured in order to help prevent carbon formation. The temperature may then be raised to a further higher temperature at which point wetting and sintering of the coating occurs.

Advantageously, steps d and e of the heat treatment allow the coating layer to fill the core layer's surface imperfections. Furthermore, the coating substantially seals direct leak paths. In one embodiment, the coating layers may be operable to seal cracks in the core layer that form during thermal cycling.

According to ninth aspect of the present invention there is provided a process for producing a gasket according to the third aspect of the present invention comprising the steps of:
a. coating a glass or glass-ceramic layer onto each of the mating surfaces to be sealed;
b. locating a core layer, sheet or foil according to the first or third aspects of the present invention between the coated mating surfaces to be sealed;
c. mating the coated surfaces and interposed core layer together;
d. optionally, heating the gasket to remove any remaining volatile organic components;
e. optionally, heating the gasket to effect sintering of the coating layers;
f. optionally, further heating to effect wetting of the coating layers.

The coating layers of the ninth aspect of the present invention may be in accordance with, prepared and applied to the mating surfaces according to any of the compositions and methods described in relation to the coating layers of the eighth aspect of the present invention. Preferably, the coating layers are applied to the mating surfaces in the form of a paste. Preferably, the method of applying the glass or glass-ceramic coating layers to the mating surfaces is by extrusion such as beading by extrusion.

Steps d to f may be carried out as described according to steps c to e of the eighth aspect of the present invention and the optional features thereof as described above.

The process may include the step of forming, preferably cutting, the sheet/foil into a core layer having required shape prior to locating it between the coated mating surfaces to be sealed.

Advantageously, the process according to this aspect permits even greater material efficiency in the production of gaskets according to the present invention. The shape of the gasket is generally dictated by the shape of the mating surfaces, however, the core layer is commonly produced in large sheets or foils. As such, shaping of the glass coated core layer sheets may result in cut-offs which can go to waste. Accordingly, by applying the glass or glass-ceramic coating layer initially to the mating surfaces, wastage of the coating composition is avoided. Furthermore, in this manner recycling of the unused parts of the core layer is more easily effected.

Usually, the coating layers will be reasonably fluid and conformable at the operating temperature of the stack. However, at lower temperatures the coating layers can solidify, for example during thermal cycling. As such, the thermal expansion coefficients (CTE) of the coating layers, the core layer and the mating surfaces may be substantially the same. Typically, the mating surfaces of the cell have a CTE in the range $10\text{-}13.10^{-6}\mathrm{K}^{-1}$ during operating temperatures. Matching of the CTE of the coating material and the mating surfaces is particularly advantageous at these temperatures but also more particularly below the operating temperature and therefore below the Tg of the coating material to avoid damage to the seal during thermal cycling. Suitably, the coating material has a CTE relative to the mating surfaces of $+/-2.10^{-6}\mathrm{K}^{-1}$, more preferably, $+/-1.5.10^{-6}\mathrm{K}^{-1}$ between 600-1000° C.

According to a tenth aspect of the present invention there is provided a process for producing a solid oxide cell component or of sealing a solid oxide cell component comprising incorporating at least one gasket according to the third aspect of the present invention into the solid oxide cell component. Said gasket may be incorporated into the solid oxide cell component according to steps b to e of the eighth aspect of the present invention or steps a to f of the ninth aspect of the present invention.

Definitions

Where values are given in % w/w herein these are based on dry weight unless indicated otherwise.

The term 'solid oxide cell" herein includes a solid oxide fuel cell or a solid oxide electrolyzer cell.

It will be appreciated that two or more of the optional features of any aspect of the invention may be combined with any aspect of the invention mutatis mutandis.

For a better understanding of the invention, and to show how embodiments of the same may be carried into effect, reference will now be made, by way of example, to the following examples.

EXAMPLES

Example gaskets 1 to 4 were prepared according to the compositions of Table 1 using the following method.

Mixing Method.

In examples 1-3 and comparative examples 1 and 2, ingredients are added in a controlled manner by using a dedicated mixer. The mixer has a blender (propeller) and an agitator (paddles) which operate independently. Both these have different speed settings during the mixing cycle. Add small volumes of the dry powders to HTS over a period time, with the mixer at medium speed. After all the powders have been added, increase mixer speed to maximum until all the powders are well dispersed.

Casting Method

Using a tape caster line, the material is passed under a doctor blade to allow a thin film of wet material to be formed to the required thickness. Once formed, the material is left to dry.

TABLE 1

Compositions used to prepare Examples 1 to 3 and Comparative Example 1 and 2

|  | Example 1 | Example 2 | Example 3 | Comparative Example 1 | Comparative Example 2 |
|---|---|---|---|---|---|
| HTS*, kg | 5 | 5 | 5 | 5 | 5 |
| D200**, kg | 0.747 | 0.814 | 0.840 | 0.960 | 0 |
| CaCO$_3$***, kg | 0.212 | 0.193 | 0.097 | — | 0.957 |
| Water | — | 0.75 | — | — | 1.26 |
| CaCO$_3$ dry wt % | 12.2 | 10.8 | 5.6 | 0 | 55 |

*water and CEV mixture containing 15.7 wt % CEV
**steatite/talc
***precipitated grade with an average particle size of 2-10 microns Comparative Example 2 produces a sheet that cracked badly during drying. No useable material was obtained due to excessive curling and cracking. Accordingly, no gaskets could be cut for testing from Comparative Example 2.

Thermal and compression cycling was carried out to test the leakage rate of dried Example gaskets 1 to 3 and comparative example 1 in SOFCs. All leakage rates were found to be within acceptable limits for SOFCs both under compression cycling and thermal cycling.

Testing Corrosion Resistance

Corrosion resistance was tested under the following conditions on the dried gasket sealing elements. Two gasket sealing elements of comparative example 1 were located on either side of a steel plate (Crofer 22 APU™) about a central aperture and the arrangement was sealed between mating end plates (Crofer 22 APU™) of a SOFC. The shape of the gasket is endless and defines a generally dumbbell shaped recess which includes the central aperture of the central plate and extends beyond this to additionally include a circular outlet of the first end plate and the corresponding circular inlet of the $2^{nd}$ end plate so that fuel can pass between the end plates and through an aperture in the central steel plate without escaping between the end plates. The radially outermost extent of the gasket is within the outer edges of the central steel plate in use so that after use any corrosion of the outwardly overlapping surfaces of the central steel plate can be inspected for corrosion damage.

Comparative example 1 showed extensive corrosion damage to the central steel plate beyond the outer edges of the gaskets. The test was repeated for examples 1-3. The presence of $CaCO_3$ in example 1 reduced the level of corrosion and together with the results of examples 2 and 3, a clear inverse correlation of concentration of $CaCO_3$ and extent of corrosion could be observed.

The outer edges of the steel plates were scored from 0-5 as follows:

| | |
|---|---|
| Substantially all outer area affected by corrosion | 5 |
| More than ¾ of the outer area affected by corrosion | 4 |
| More than half of the outer are affected by corrosion | 3 |
| More than ¼ of the outer area affected by corrosion | 2 |
| Corrosion of the outer area slight but observable | 1 |
| No clear corrosion of the outer area | 0 |

The results are shown in table 2.

TABLE 2

Corrosion Testing Results

| | Example 1 | Example 2 | Example 3 | Comparative Example 1 |
|---|---|---|---|---|
| Test Score* | 0 | 1 | 3 | 5 |

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A gasket for sealing two mating surfaces of a solid oxide cell, the gasket comprising a core layer interposed between a first and a second coating layer, wherein the core layer comprises a composite sealing material comprising:
   (a) a chemically exfoliated vermiculite ("CEV");
   (b) a filler; and
   (c) an insoluble carbonate, wherein the insoluble carbonate has a solubility in water of less than 0.1 g/ml at 25° C.;
wherein the coating layers each comprise glass, glass-ceramic, and/or ceramic material, and wherein the coating layers have a softening temperature in the range of 500° C. to 950° C.

2. The gasket according to claim 1, wherein the composite sealing material is in the form of a sheet or foil.

3. The gasket according to claim 1, wherein the composite sealing material comprises 1-15% w/w insoluble carbonate.

4. The gasket according to claim 1, wherein the CEV provides up to 100% w/w of a total exfoliated vermiculite in the composite sealing material.

5. The gasket according to claim 1, wherein a level of the CEV in the composite sealing material is at least 25% w/w.

6. The gasket according to claim 1, wherein the filler is one or more inert fillers.

7. The gasket according to claim 1, wherein a level of the filler in the composite sealing material is at least 25% w/w.

8. The gasket according to claim 1, wherein the CEV, filler, and insoluble carbonate are intimately mixed in the composite sealing material and evenly distributed throughout the composite sealing material so that they form a generally homogenous mixture.

9. The gasket according to claim 1, wherein the composite sealing material has a density prior to use of 1.5-2.2 $g/cm^3$.

10. The gasket according to claim 1, wherein the composite sealing material is compressible; and wherein an uncompressed thickness of the sealing material is in the range of 10-2000 μm.

11. The gasket according to claim 1, wherein the insoluble carbonate is selected from a group II carbonate.

12. The gasket according to claim 11, wherein the group II carbonate is selected from at least one of calcium carbonate or strontium carbonate.

13. The gasket according to claim 11, wherein the group II carbonate is calcium carbonate.

14. The gasket according to claim 1, wherein the filler does not comprise an insoluble carbonate.

15. The gasket according to claim 1, wherein the CEV is not modified CEV comprising water resistance enhancing monovalent cations.

16. The gasket of claim 1, wherein the solid oxide cell is configured to be operable at a temperature above 500° C.

17. The gasket of claim 1, wherein the solid oxide cell is configured to be operable at a temperature above 600° C.

18. The gasket according to claim 1, wherein the coating layers each comprise glass or glass-ceramic material.

19. The gasket according to claim 1, wherein the coating layers each comprise glass material.

20. A solid oxide cell or a solid oxide cell component comprising one or more gaskets according to claim 1.

21. A process for sealing a solid oxide cell component comprising incorporating at least one gasket according to claim 1 into the solid oxide cell component.

* * * * *